United States Patent
Shibata (10) Patent No.: US 8,070,247 B2
(45) Date of Patent: Dec. 6, 2011

(54) LIQUID EJECTING APPARATUS AND CONTROLLING METHOD THEREOF

(75) Inventor: Hitomi Shibata, Shizuoka (JP)

(73) Assignee: Seiko Epson Corporation, Tokyo (JP)

( * ) Notice: Subject to any disclaimer, the term of this patent is extended or adjusted under 35 U.S.C. 154(b) by 771 days.

(21) Appl. No.: 12/218,521

(22) Filed: Jul. 16, 2008

(65) Prior Publication Data

US 2009/0021544 A1    Jan. 22, 2009

(30) Foreign Application Priority Data

Jul. 17, 2007 (JP) ................. 2007-185911

(51) Int. Cl.
  *B41J 29/38* (2006.01)
  *B41J 29/393* (2006.01)
(52) U.S. Cl. ............... 347/14; 347/13; 347/19
(58) Field of Classification Search ............ 347/13, 347/14
  See application file for complete search history.

(56) References Cited

U.S. PATENT DOCUMENTS

| | | | | |
|---|---|---|---|---|
| 7,306,314 B2 * | 12/2007 | Uemura | ........................ | 347/19 |
| 7,690,750 B2 * | 4/2010 | Kawatoko et al. | ............... | 347/19 |
| 7,699,429 B2 * | 4/2010 | Furuya | ............................ | 347/19 |

FOREIGN PATENT DOCUMENTS

| | | |
|---|---|---|
| JP | 06-031937 | 2/1994 |
| JP | 2005-132066 | 5/2005 |
| JP | 2005-224659 | 8/2005 |
| JP | 2006-015590 | 1/2006 |

* cited by examiner

*Primary Examiner* — Omar Rojas
(74) *Attorney, Agent, or Firm* — Nutter McClennen & Fish LLP; John J. Penny, Jr.; Michael P. Visconti, III (57) ABSTRACT

There is provided a liquid ejecting apparatus including a head unit in which a plurality of heads in each of which a plurality of nozzles are disposed in a direction perpendicular to a recording medium transport direction are provided in the direction perpendicular to the recording medium transport direction, a control unit for driving the head unit based on image information and for performing a liquid ejection timing control for ejecting liquid from the nozzle to a recording medium for every nozzle, and an inclination amount storage unit in which inclination information of the head unit is preliminarily stored. The control unit has a calculator for calculating the most appropriate ejection timing with respect to the recording medium transport direction for every nozzle of each head from the image information and the inclination information of the head unit.

8 Claims, 5 Drawing Sheets

LIQUID EJECTING APPARATUS AND CONTROLLING METHOD THEREOF

BACKGROUND

1. Technical Field

The present invention relates to a liquid ejecting apparatus having a head unit in which a plurality of heads are sequentially provided in the direction perpendicular to a recording medium transport direction and a controlling method thereof.

2. Related Art

A serial printer such as a dot impact printer, an ink jet printer, and the like functions to print a character or an image by a dot unit or a character unit while moving a print head for ink ejection in the direction perpendicular to a recording medium transport direction. On the other hand, a line printer functions to print a character or an image by a (column) line unit on a recording medium to be transported by a fixed print head.

Among the printers, in the line printer, in order to precisely print an image or a character, it is necessary to increase the number of dots (the number of pixels) per one inch. Accordingly, many nozzles which make it possible to make correspond to the number of dots are provided to the head with a fine distance (for example, see JP-A-2006-15590).

Further, in order to print a color image or the like, the plurality of nozzles are provided on the head so as to separately eject a plurality colors such as cyan, magenta, yellow, black, or the like of ink. Then, by ejecting ink of the each color at a predetermined timing from each nozzle, the ink is applied one from another on a recording medium to be supplied and transported in the recording medium transport direction and an image or a character can be printed.

However, it is difficult to fabricate a head having the fine and many nozzles, and it involves a difficulty to form the head having a length (length in the direction perpendicular to the recording medium transport direction) which allows to print on a recording medium having a size of, for example, A4 size, A3 size, or the like at the same time by one head from the view points of manufacturing technology and cost.

Accordingly, a head unit in which heads each having a plurality of nozzles are sequentially provided in the direction perpendicular to a recording medium transport direction so as to match with the size of the recording medium has been used for the ink ejecting apparatus from the past. In the ink ejecting apparatus, by ejecting an ink drop form the nozzle by driving the head unit based on image information or the like, the ink drop can be landed (applied) on a regular position on the recording medium as a recording medium.

A space is provided between the plurality of heads that are sequentially provided in the direction perpendicular to the recording medium transport direction to constitute the head unit due to various errors of the head shape and size, or attachment. In order to complement the space, one head unit having a length by which an image or the like can be printed along the entire width of a recording medium as a whole is constituted by providing a discrete head in parallel in the recording medium transport direction. By the line head, an ink drop can be applied on a same line on a recording medium.

However, in the conventional line printer, due to the various errors, there is a case in that the head unit itself is attached to incline with respect to a reference direction (for example, the direction perpendicular to the recording medium transport direction) or each head constituting the head unit is attached to incline with each other or with respect to the direction perpendicular to the recording medium transport direction. In this case, the positions of the nozzles provided in each head also incline (positionally shift) in a similar way. As a result, ink is landed at a position shifted from a regular position of the recording medium supplied and transported in the recording medium transport direction. As a result, color shift due to color mixture failure or banding (strip shaped print unevenness generated in the direction perpendicular to the recording medium transport direction) generates in a print image.

SUMMARY

An advantage of some aspects of the invention is to provide a liquid ejecting apparatus capable of applying an ink drop corresponding to image information at a regular position on a recording medium to be transported even when a unit head or a head itself inclines with respect to a recording medium transport direction which is a reference direction, and to provide a method for controlling the liquid ejecting apparatus.

According to an aspect of the invention, there is provided a liquid ejecting apparatus including a head unit in which a plurality of heads in each of which a plurality of nozzles are disposed in a direction perpendicular to a recording medium transport direction are provided in the direction perpendicular to the recording medium transport direction, a control unit for driving the head unit based on image information and for performing a liquid ejection timing control for ejecting liquid from the nozzle to a recording medium for every nozzle, and an inclination amount storage unit in which inclination information of the head unit is preliminarily stored. The control unit has a calculator for calculating the most appropriate ejection timing with respect to the recording medium transport direction for every nozzle of each head from the image information and the inclination information of the head unit.

With the constitution, it becomes possible to eject liquid from each nozzle at the most appropriate timing depending on the inclination of the head unit and to avoid generation of color shift based on color mixture or banding in an image recorded on the recording medium by accurately landing the liquid at a regular position on the recording medium.

It is preferable that the head has a nozzle disposed to shift in the recording medium transport direction among the plurality of nozzles disposed in the direction perpendicular to the recording medium transport direction, and the calculator calculates the most appropriate ejection timing as for the nozzle disposed to shift in the recording medium transport direction in the liquid ejecting apparatus according to the aspect of the invention.

With the constitution, liquid can be accurately landed at a regular position on the recording medium in accordance with the shift of the head unit also for the nozzle disposed to shift at the joining section of each head constituting the head unit.

It is preferable that the control unit has a selector for calculating a shift amount in the direction perpendicular to the recording medium transport direction from the image information and the inclination information of the head unit and for selecting a nozzle disposed at the most appropriate position for ejecting liquid based on the shift amount in the liquid ejecting apparatus according to the aspect of the invention.

With the constitution, liquid can be landed at approximately the same position as when there is no inclination in the head with respect to the direction perpendicular to the recording medium transport direction.

It is preferable that the inclination information of the head unit is inclination information that is calculated based on an inclination amount of the head unit with respect to the direction perpendicular to the recording medium transport direction which becomes a reference after the head unit is embedded and an inclination amount of another head with respect to a reference head constituting the head unit in the liquid ejecting apparatus according to the aspect of the invention.

With the constitution, the most appropriate timing can be calculated and the nozzle disposed at the most appropriate position can be selected based on the inclination amount of the head unit with respect to the direction perpendicular to the recording medium transport direction which becomes a reference after the head unit is embedded and the inclination amount of another head with respect to the reference head.

According to another aspect of the invention, there is provided a method for controlling a liquid ejecting apparatus equipped with a head unit in which a plurality of heads in each of which a plurality of nozzles are disposed in a direction perpendicular to a recording medium transport direction are provided in the direction perpendicular to the recording medium transport direction, a control unit for driving the head unit based on image information and for performing a liquid ejection timing control for ejecting liquid from the nozzle to a recording medium for every nozzle, and an inclination amount storage unit in which inclination information of the head unit is preliminarily stored. The method for controlling a liquid ejecting apparatus includes calculating the most appropriate ejection timing with respect to the recording medium transport direction for every nozzle of each head, and ejecting liquid from each nozzle to the recording medium at the calculated most appropriate ejection timing.

Herewith, it becomes possible to eject liquid from each nozzle at the most appropriate timing depending on the inclination of the head unit and the liquid can be accurately landed at a regular position on the recording medium. Accordingly, generation of color shift based on color mixture or banding in an image recorded by liquid on the recording medium can be efficiently avoided.

It is preferable that the head has a nozzle disposed to shift in the recording medium transport direction among the plurality of nozzles disposed in the direction perpendicular to the recording medium transport direction, and calculation of the most appropriate ejection timing is performed as for the nozzle disposed to shift in the recording medium transport direction in the method for controlling a liquid ejecting apparatus according to the another aspect of the invention.

Herewith, liquid can be landed at a regular position on the recording medium in accordance with the shift of the head unit also for the nozzle disposed to shift at the joining section of each head constituting the head unit.

It is preferable that the method for controlling a liquid ejecting apparatus according the another aspect of the invention further includes calculating a shift amount in the direction perpendicular to the recording medium transport direction from the image information and the inclination information of the head unit, and, selecting a nozzle disposed at the most appropriate position for ejecting liquid based on the shift amount.

Herewith, liquid can be landed at approximately the same position as when there is no inclination in the head with respect to the direction perpendicular to the recording medium transport direction.

Further, it is preferable that the inclination amount of the head unit is calculated based on an inclination amount of the head unit with respect to the head unit which becomes a reference and an inclination amount of another head with respect to a reference head constituting the head unit in the method for controlling a liquid ejecting apparatus according to the another aspect of the invention.

Herewith, liquid can be accurately landed at a regular position on a recording medium at the most appropriate timing from the selected nozzle disposed at the most appropriate position in accordance with the inclination amount with respect to each reference of the head unit and the head.

Further, it is preferable that the inclination information of the head unit is calculated based on an inclination amount of the head unit with respect to the direction perpendicular to the recording medium transport direction which becomes a reference after the head unit is embedded and an inclination amount of another head with respect to a reference head constituting the head unit in the method for controlling a liquid ejecting apparatus according to the another aspect of the invention.

Herewith, the most appropriate timing can be calculated and the nozzle disposed at the most appropriate position can be selected based on the inclination amount of the head unit with respect to the direction perpendicular to the recording medium transport direction which becomes a reference after the head unit is embedded and the inclination amount of another head with respect to the reference head.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

A liquid ejecting apparatus according to the embodiment of the invention will be described with reference to FIGS. 1 to 6.

Figure 1:
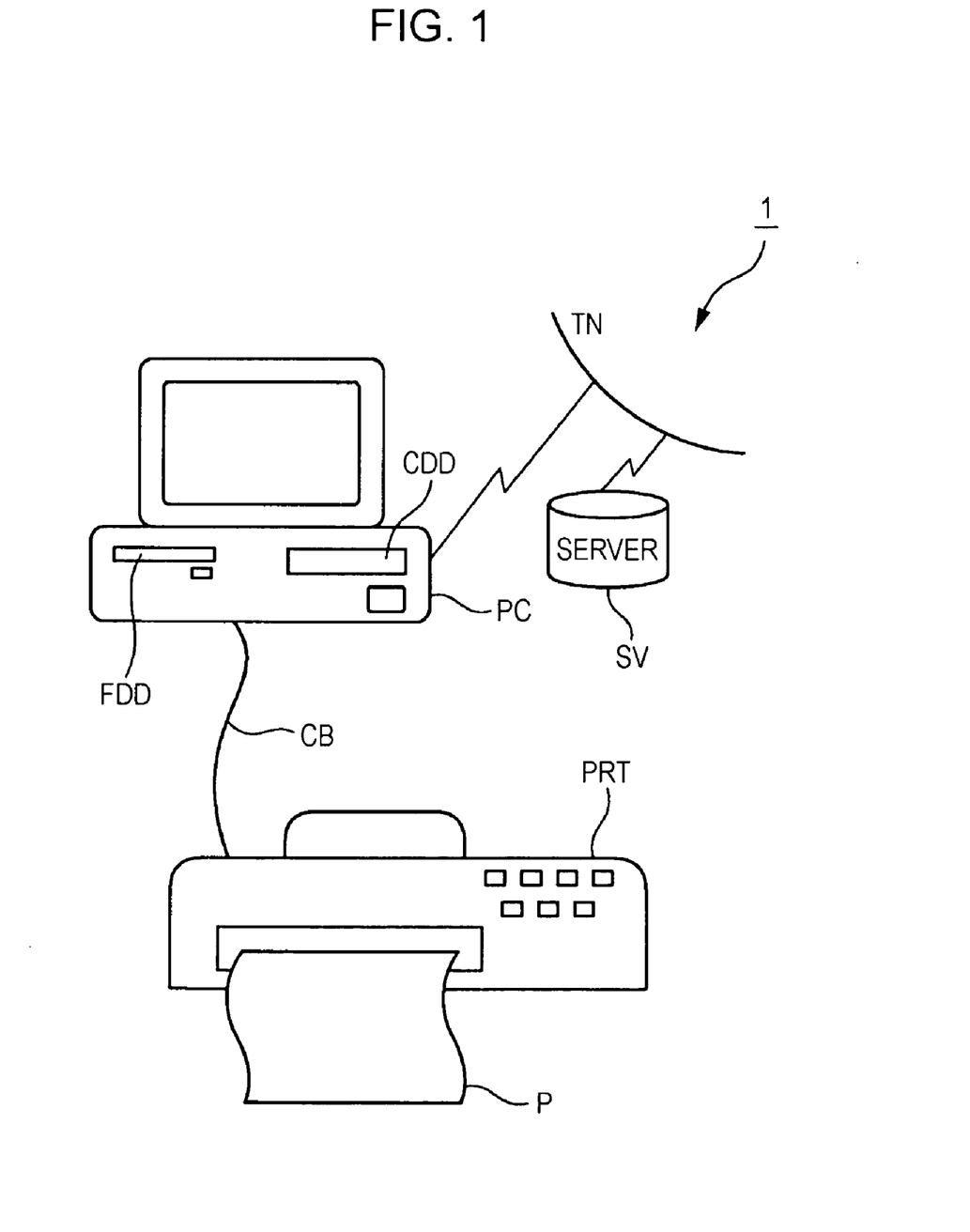
FIG. 1 is a configuration diagram showing an outline of a print system constituted by a printer (liquid ejecting apparatus) and a computer according to the embodiment.
Figure 2:
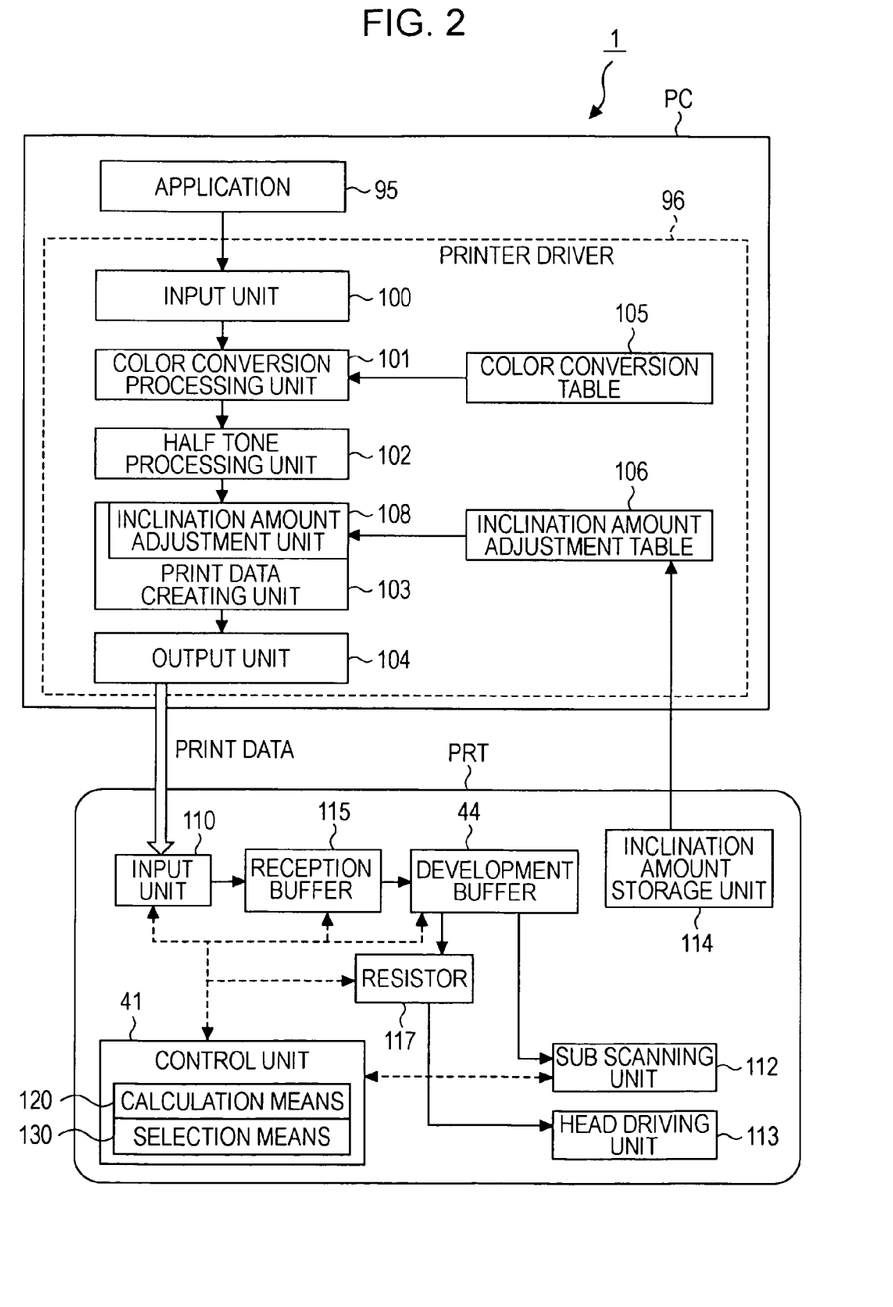
FIG. 2 is an explanatory diagram showing a function block of the print system in FIG. 1.
Figure 3:
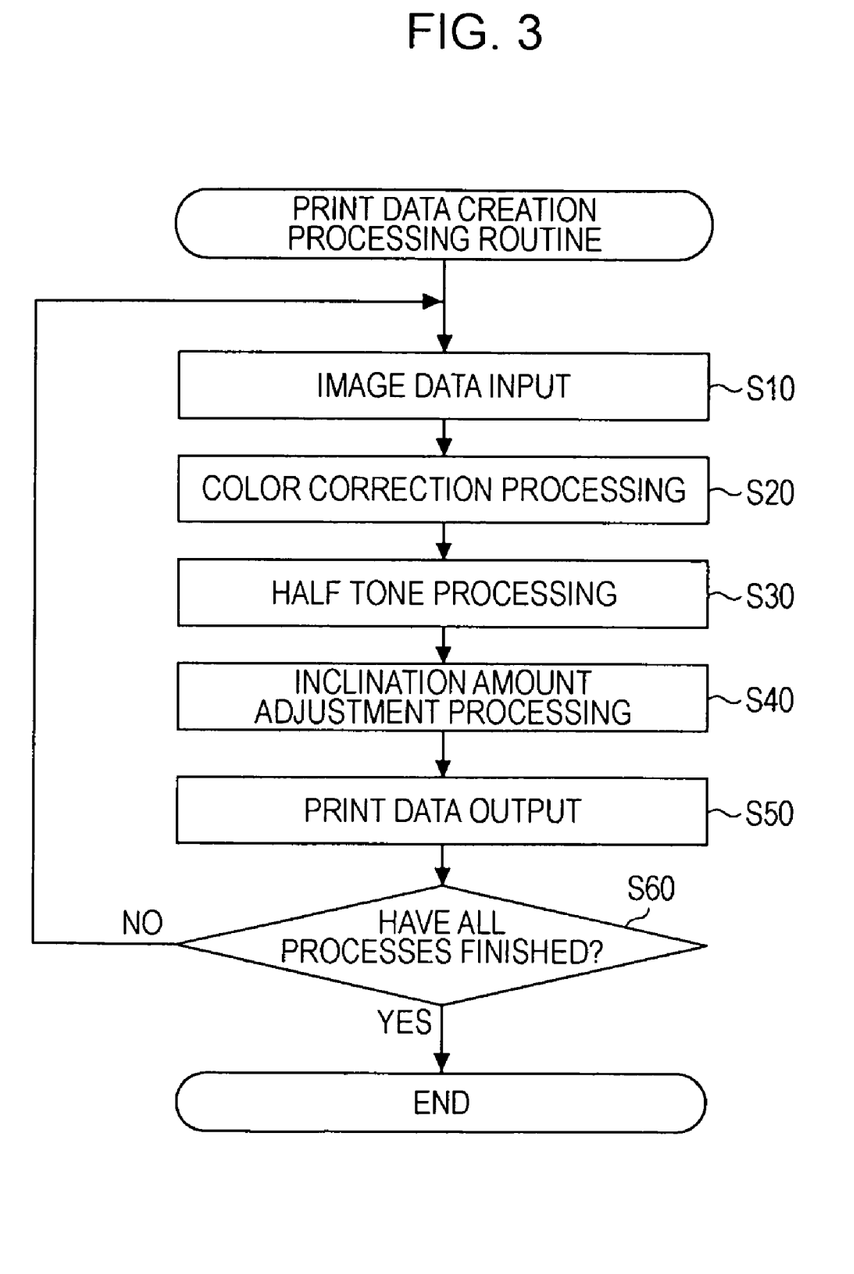
FIG. 3 is a flow chart showing a print data creating routine in the invention.
Figure 4:
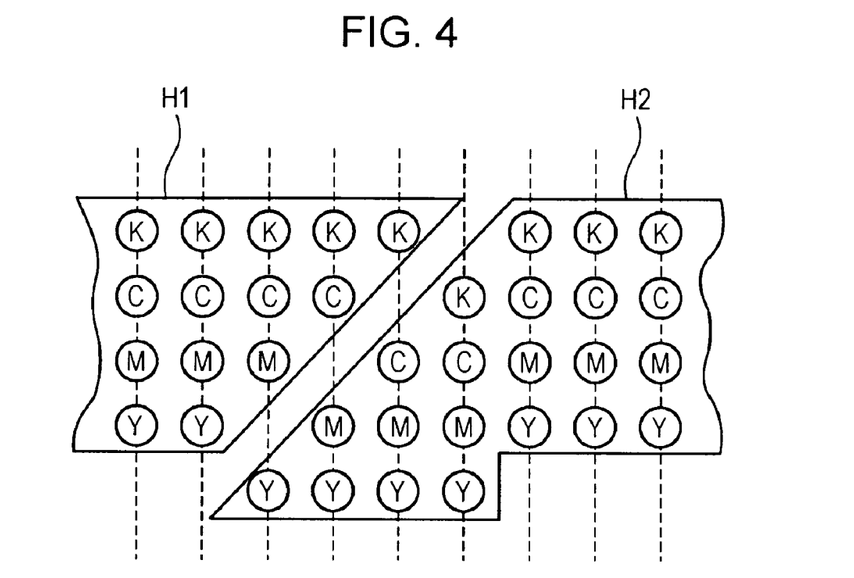
FIG. 4 is an explanatory diagram showing a joining section of a head constituting a head unit of the invention.
Figure 5:
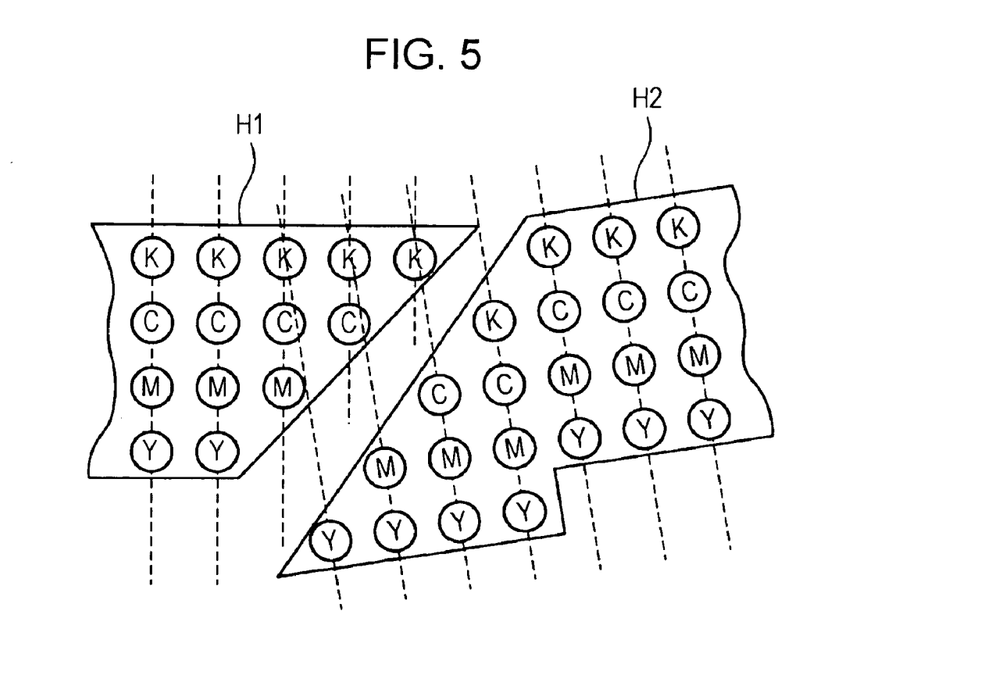
FIG. 5 is an explanatory diagram showing an inclination state of the head in FIG. 4.
Figure 6:
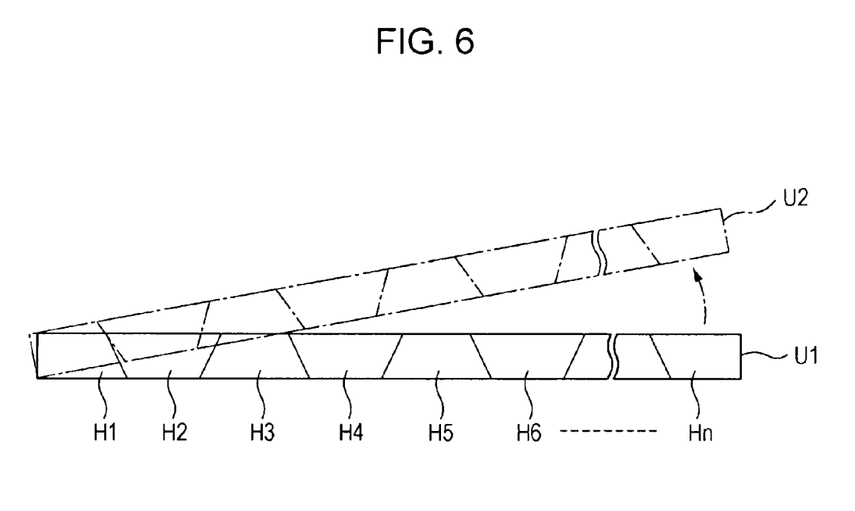
FIG. 6 is an explanatory diagram showing an inclination state of the entire head unit in the invention.

FIG. 1 is a configuration diagram showing an outline of a print system constituted by a printer which is a liquid ejecting apparatus according to the embodiment and a computer connected to the printer, FIG. 2 is an explanatory diagram showing a function block of the print system, FIG. 3 is a flow chart showing a print data creating routine, FIG. 4 is an explanatory diagram showing a joining section of heads constituting a head unit, FIG. 5 is an explanatory diagram showing an inclination state of the heads in FIG. 4, and FIG. 6 is an explanatory diagram showing an inclination state of the entire head unit.

Note that the printer described below may be a thermal ink jet type although described as a printer of a piezo ink jet type.

In FIG. 1, the print system 1 is constituted by connecting a printer PRT with a computer PC by a cable CB. The computer PC forwards print data to the printer PRT and plays a role to control the operation of the printer PRT. The control is performed based on a program called a printer driver in the computer PC.

The computer PC can load a program from a flexible disc or a CD-ROM respectively via a flexible disc drive FDD or a CD-ROM drive CDD to execute the program. Further, the computer PC is connected to a network TN and a program can be downloaded by accessing a specific server SV.

FIG. 2 is an explanatory diagram showing a function block of the print system 1. An application program 95 is operated under a predetermined operating system in the computer PC. A printer driver 96 is installed in the operating system. The application program 95 performs processing such as creation of image data. Then, the printer driver 96 creates print data from the image data.

Each operation unit of an input unit 100, a color conversion processing unit 101, a color conversion table 105, a half tone processing unit 102, a print data creating unit 103, an inclination amount adjustment table 106, and an output unit 104 is provided in the printer driver 96.

When a print order is output form the application program 95, the printer driver 96 receives image data by the input unit 100 and once accumulates the image data. The color conversion processing unit 101 performs color conversion processing for converting a color component of the image data to a color component corresponding to ink of the printer RPT. The color conversion processing is performed by referencing the color conversion table 105 in which a correspondence relationship between a color component of the image data and the color component capable of displaying by ink for the printer PRT is preliminarily stored.

The half tone processing unit 102 performs a half tone processing with respect to the data subjected to the color conversion processing in this manner in order to express a gray scale value of each of pixels at a recording density of dots. Then, an inclination amount adjusting unit (unit for adjusting shift amount of nozzle) 108 included in the data creating unit 103 adds shift amount adjustment data to the data subjected to half tone processing.

Herewith, print data capable of compensating a shift of a landing position of ink (landing position) can be created. Inclination amount (shift amount) adjustment data is set by referencing the inclination amount (shift amount) data stored in the inclination amount storage unit 114 provided at the printer PRT side and stored in the inclination amount adjustment table 106. Then, the print data creating unit 103 creates print data by adding predetermined information such as resolution of image to the image data to which the inclination amount adjustment data is added.

The print data created in this manner is output to the printer PRT from the output unit 104. The print data is subsequently converted and fabricated into various modes to an electrical signal for driving the machine in reality, and printing is executed.

Each operation unit of an input unit 110, a reception buffer 115, a development buffer 44, a resistor 117, a sub scanning unit 112, and a head driving unit 113 is provided in the printer PRT. Further the each unit is controlled by a control unit 41. Calculation means 120 and selection means 130 described below are provided in the control unit 41.

In the printer PRT, the print data transferred from the printer driver 96 is received by the input unit 110 and is once stored in the reception buffer 115. Then, a plurality of lines of data is sequentially transmitted to the development buffer 44 from the reception buffer 115 for every one line unit. Then, dot formation information corresponding to one pixel for each nozzle is collectively taken out from dot formation information corresponding to one line and is transmitted to the register 117.

The register 117 transmits the data to the head driving unit 113. Then, the head driving unit 113 drives heads in accordance with the data to print an image. On the other hand, data showing a transport method of a sub scanning (scanning of a recording medium in a transport direction) is also taken out from data corresponding to one line in the development buffer 44 is transmitted to the sub scanning unit 112.

Then, the sub scanning unit 112 transports a recording medium P (print paper, OHP sheet, or the like) in accordance with the data. The functions of the each unit in the printer PRT are specifically performed by the control unit 41 of the printer PRT, a PROM not shown, a RAM not shown, the development buffer 44, and the like.

The printer PRT transports the recording medium P by a paper feeding motor, performs ink ejection and dot formation by driving each head, and the control unit 41 controls exchange of signals between with the paper feeding motor, the head, and an operation panel.

The head includes a piezo element and a nozzle. When a predetermined driving voltage is applied to the piezo element by the control unit 41, an ink flow path is deformed by deformation of the piezo element and ink is ejected from the nozzle.

The control unit 41 includes the calculation means 120 and selection means 130 of data for correcting a positional shift amount (inclination amount) of a head unit or the heads. Among the means, the calculation means 120 functions to calculate the most appropriate ejection timing with respect to the recording medium transport direction from the image information and the inclination information of the head unit for every nozzle of each head, and the selection means 130 functions to select a nozzle disposed at the most appropriate position of the recording head with respect to the direction perpendicular to the recording medium transport direction form the image information and the inclination information of the head unit.

Next, a control process for correcting the positional shift of the head or the head unit will be described. Dots for recreating the image received from the application program 95 are two dimensionally formed in the direction perpendicular to the recording medium transport direction and the recording medium transport direction (sub scanning direction) on the recording paper P.

FIG. 3 is a flow chart of a print data creation processing routine. The process is a process that is executed by the printer driver 96 in the computer PC. When the processing is started, image data is input into the input unit 100 (step S10). The image data input here is the data that is received from the application program 95 shown in FIG. 2 and is the data having gray scale value of 256 levels of 0 to 255 as for each color of R, G, B for every pixel constituting an image. The resolution of the image data varies in accordance with the resolution or the like of the data of an original image.

Next, the color conversion processing unit 101 performs color conversion processing of the input image data (step S20). The color conversion processing is processing for converting the image data constituted by gray scale values of R, B, G to gray scale value data of each ink used in the printer PRT. The processing is performed by using the color conversion table 105. As for the processing itself for performing color conversion by using the color conversion table 105, various known techniques are applicable and for example, processing performed by a complementary calculation can be applied.

When the color conversion processing is finished, the half tone processing unit 102 performs a half tone processing for each ink (step S30). The half tone processing is processing for converting the gray scale value (256 gray scale in the embodiment) of an original image data to image pixel value data of n bit (n is natural number) showing a formation state of a dot on each pixel. The half tone processing can be performed by various well known methods such as an error spreading method, a dither method, or the like.

When the half tone processing is finished, the print data creating unit 103 selects a nozzle for ejecting ink to perform distribution of print pixels (step S40).

By the way, a head unit U of a line printer is formed by joining a plurality of heads H1 to Hn on a same line. However, there generates a fine space in which no nozzle is provided due to generation of a manufacturing error or an assembly error. That is, no ink is landed on a recording medium that passes through the fine space from a nozzle.

Consequently, as shown in FIG. 4, the position of the nozzle positioned at a joining section of the head H2 with respect to the head H1 is disposed to shift by, for example, one nozzle in the recording medium transport direction and an adjustment is performed so that the driving timing of the nozzle is delayed by the time corresponding to the shift. By the driving of each head in this manner, it can be prevented to make a space in which no ink is landed on the recording medium. Note that in the example shown in FIG. 4, nozzles K (black), C (cyan), M (magenta), Y (yellow) that eject each color of ink are disposed in the recording medium transport direction.

However, in such a head unit U, when a head H2 is attached to incline with respect to a head H1 which becomes a reference or a preliminarily fixed reference line (for example, direction perpendicular to the recording medium transport direction) as shown in FIG. 5, positions of every nozzles provided in the head H2 are changed with respect to positions of the nozzles of the head in the case where the head H2 does not incline. Consequently, the landing position of ink of each color ejected form each nozzle on the recording medium is shifted in the recording medium transport direction from a regular position in the case where the head H2 does not incline.

Consequently, the head is driven so as to eject ink at the most appropriate timing to the recording medium transport direction for each nozzle in which the position is changed. In this case, since inclination information of the head attached to incline, that is a shift amount of each nozzle is preliminarily stored in the inclination amount storage unit 114, the printer driver 96 obtains an adjustment value of the most appropriate ink ejection timing corresponding to the shift amount with respect to the recording medium transport direction. Then, the inclination amount adjustment unit 108 in the print data creating unit 103 determines the most appropriate ejection timing for ejecting ink of each color based on the adjustment value with respect to the recording medium transport direction.

The most appropriate ejection timing is added to the data processed by the half tone processing unit 102 as inclination amount adjustment data with respect to the recording medium transport direction in the print data creating unit 103.

Further, like in the FIG. 5, when the head H2 is attached to incline, an ink landing position on the recording medium is shifted not only in the recording medium transport direction, but also in the direction perpendicular to the recording medium transport direction.

Nozzles are disposed at a high density in the line head (in particular, densely disposed in the direction perpendicular to the recording medium transport direction), and there is an allowance in the number of nozzles used for image formation, so that there is no trouble for image formation even when the nozzle for ejecting ink is changed a little.

Consequently, by calculating a shift amount in the direction perpendicular to the recording medium transport direction from the inclination of the head H2, the nozzle for ejecting ink can be changed in accordance with the calculated shift amount (shift amount in the direction perpendicular to the recording medium transport direction).

Herewith, ink can be landed at approximately the same position as when there is no inclination in head H2 with respect to the direction perpendicular to the recording medium transport direction.

That is, the nozzle disposed at the most appropriate position for ejecting ink is selected based on the shift amount with respect to the direction perpendicular to the recording medium transport direction. The information of the selected nozzle is transported to the inclination amount adjustment unit 108 in the print data creating unit 103 and added to the data processed by the half tone processing unit 102 as inclination amount adjustment data with respect to the direction perpendicular to the recording medium transport direction in the print data creating unit 103.

The print data creating unit 103 creates print data by adding information such as resolution to the image data to which the inclination amount adjustment data (the most appropriate ejection timing and the nozzle disposed at the most appropriate position, or the most appropriate ejection timing or the nozzle disposed at the most appropriate position) is added. The created print data is output to the printer PRT from the output unit 104.

The calculation of the most appropriate ejection timing of ink and the selection of the nozzle disposed at the most appropriate position in accordance with the shift in the case where the head H2 inclines is executed in the control unit 41 by referencing the inclination amount (shift amount) adjustment table 106 created based on the data obtained by a well known geometric calculation method or the like.

In this manner, when the head H2 is attached to incline with respect to a reference direction, positions of every nozzles provided in the head H2 are made correspond to positions of the nozzles in the case where the head H2 does not incline. Herewith, similarly to the case where the head H2 does not incline, ink can be ejected towered a regular ink landing position on the recording medium P.

On the other hand, there is a case that the entire of the head unit U constituted by the plurality of heads H1 to Hn may depart from a preliminarily determined reference direction (for example, the direction perpendicular to the recording medium transport direction) and incline in the U2 direction from the regular U1 direction as shown in FIG. 6. In this case, the position of each nozzle in each head H1 to Hn is also shifted from the regular position. The shifted position is to be stored in the inclination amount storage unit 114. Also in this case, the printer driver 96 obtains an adjustment value of the most appropriate ejection timing and the nozzle disposed at the most appropriate position in accordance with the shift amount by the inclination adjustment table 106.

Further, in the inclination amount adjustment unit 108 in the print data creating unit 103, the most appropriate ejection timing for ejecting ink of each color and the nozzle disposed at the most appropriate position, or the most appropriate ejection timing or the nozzle disposed at the most appropriate position is determined based on the adjustment value and is added to the data processed by the half tone processing unit 102. Herewith, print data which makes it possible to compensate the ink landing position of ink is created. Accordingly, the print data creating unit 103 creates print data by adding information such as resolution to the image data to which inclination amount adjustment data is added and output the created print data to the printer PRT from the output unit 104.

As a result, similarly to the case where the head unit U does not incline with respect to the reference direction, ink of each color can be ejected towered a regular ink landing position on the recording medium.

In this manner, the liquid ejecting apparatus according to the embodiment includes a head unit U in which a plurality of heads in each of which a plurality of nozzles are disposed in a direction perpendicular to a recording medium transport direction are provided in the direction perpendicular to the recording medium transport direction, a control unit 41 for driving the head unit U based on image information and for performing a liquid ejection timing control for ejecting liquid from the nozzle to a recording medium P for every nozzle, and an inclination amount storage unit 114 in which inclination information of the head unit U is preliminarily stored. The control unit 41 has calculation means 120 for calculating the most appropriate ejection timing with respect to the recording medium transport direction for every nozzle of each head from the image information and the inclination information of the head unit U. Herewith, it becomes possible to eject liquid at the most appropriate timing depending on the inclination of the head unit U and to avoid generation of color shift based on color mixture or banding in an image recorded on the recording medium P by accurately landing the liquid at a regular position on the recording medium P.

In the embodiment, the liquid ejecting apparatus is realized by the ink jet type recording device (printer). However, the liquid ejecting apparatus is not limited to the printer and may also realized by a liquid ejecting apparatus for, for example, ejecting liquid except ink (besides liquid, including a liquid body in which particles of functional materials are dispersed, a granular body such as a gel). For example, a liquid ejecting apparatus for ejecting a liquid body containing a material such as an electrode material, a color material or the like used for manufacturing a liquid crystal display, an EL (electro luminescence) display, a surface emitting display, a color filter, or the like, a liquid ejecting apparatus for ejecting a bio-organic substance used for manufacturing a biochip, and a liquid ejecting apparatus for ejecting liquid to be a sample used as a precision pipette may be employed. Further, a liquid ejecting apparatus for ejecting motor oil to a precision machine such as a watch, a camera, and the like at pin point, a liquid ejecting apparatus for ejecting a transparent resin liquid such as an ultraviolet curing resin on a substrate for forming a fine hemispherical lens (optical lens) for use in an optical communication element, a liquid ejecting apparatus for ejecting an etching liquid such as an acid, an alkali, or the like for etching a substrate or the like, a liquid body ejecting apparatus for ejecting a gel, a fine particle ejection type recording apparatus for ejecting a solid such as fine particles such as a toner may also be employed. Then, the invention can be applied to an ejecting apparatus of one of the apparatuses.

What is claimed is:

1. A liquid ejecting apparatus comprising:
   a head unit in which a plurality of heads are provided in a direction perpendicular to a recording medium transport direction, each of the plurality of heads having a plurality of nozzles disposed in the direction perpendicular to the recording medium transport direction;
   a control unit for driving the head unit based on image information and for performing a liquid ejection timing control for each of the plurality of nozzles for ejecting liquid from each of the plurality of nozzles to a recording medium; and
   an inclination amount storage unit in which inclination information of the head unit is stored, wherein
   the control unit has a calculator for calculating the most appropriate ejection timing with respect to the recording medium transport direction for each of the plurality of nozzles of each of the plurality of heads, based on the image information and the inclination information of the head unit, and
   the control unit has a selector for calculating a shift amount in the direction perpendicular to the recording medium transport direction from the image information and the inclination information of the head unit and for selecting a nozzle disposed at the most appropriate position for ejecting liquid based on the shift amount.

2. The liquid ejecting apparatus according to claim 1, wherein
   at least one of the plurality of heads has a nozzle that is shifted in the recording medium transport direction, and the calculator calculates the most appropriate ejection timing for the nozzle that is shifted in the recording medium transport direction.

3. The liquid ejecting apparatus according to claim 1, wherein the inclination information of the head unit is calculated based on:
   an inclination amount of the head unit with respect to the direction perpendicular to the recording medium transport direction, and
   an inclination amount of one of the plurality of heads with respect to another of the plurality of heads.

4. A method for controlling a liquid ejecting apparatus equipped with
   a head unit in which a plurality of heads are provided in a direction perpendicular to a recording medium transport direction, each of the plurality of heads having a plurality of nozzles disposed in a direction perpendicular to the recording medium transport direction,
   a control unit for driving the head unit based on image information and for performing a liquid ejection timing control for each of the plurality of nozzles for ejecting liquid from each of the plurality of nozzles to a recording medium, and
   an inclination amount storage unit in which inclination information of the head unit is stored, the method for controlling a liquid ejecting apparatus comprising:
   calculating the most appropriate ejection timing with respect to the recording medium transport direction for each of the plurality of nozzles of each of the plurality of heads based on the image information and the inclination information of the head unit;
   ejecting liquid from each of the plurality of nozzles to the recording medium at the calculated most appropriate ejection timing;
   calculating a shift amount in the direction perpendicular to the recording medium transport direction from the image information and the inclination information of the head unit; and
   selecting a nozzle disposed at the most appropriate position for ejecting liquid based on the shift amount.

5. The method for controlling a liquid ejecting apparatus according to claim 4, wherein
   at least one of the plurality of heads has a nozzle that is shifted in the recording medium transport direction, and the method further comprises calculating the most appropriate ejection timing for the nozzle that is shifted in the recording medium transport direction.

6. The method for controlling a liquid ejecting apparatus according to claim 4, wherein the inclination information of the head unit is calculated based on:
an inclination amount of the head unit with respect to the direction perpendicular to the recording medium transport direction, and
an inclination amount of one of the plurality of heads with respect to another of the plurality of heads.

7. A liquid ejecting apparatus comprising:
a head unit in which a plurality of heads are provided in a direction perpendicular to a recording medium transport direction, each of the plurality of heads having a plurality of nozzles disposed in the direction perpendicular to the recording medium transport direction;
a control unit for driving the head unit based on image information and for performing a liquid ejection timing control for each of the plurality of nozzles for ejecting liquid from each of the plurality of nozzles to a recording medium; and
an inclination amount storage unit in which inclination information of the head unit is stored, wherein:
the control unit has a calculator for calculating the most appropriate ejection timing with respect to the recording medium transport direction for each of the plurality of nozzles of each of the plurality of heads, based on the image information and the inclination information of the head unit, and
the inclination information of the head unit is calculated based on:
an inclination amount of the head unit with respect to the direction perpendicular to the recording medium transport direction, and
an inclination amount of one of the plurality of heads with respect to another of the plurality of heads.

8. The liquid ejecting apparatus according to claim 7, wherein
at least one of the plurality of heads has a nozzle that is shifted in the recording medium transport direction, and the calculator calculates the most appropriate ejection timing for the nozzle that is shifted in the recording medium transport direction.

* * * * *